(12) United States Patent  (10) Patent No.: US 7,934,390 B2
Eva  (45) Date of Patent: May 3, 2011

(54) METHOD FOR MANUFACTURING A LENS OF SYNTHETIC QUARTZ GLASS WITH INCREASED $H_2$ CONTENT

(75) Inventor: Eric Eva, Aalen (DE)

(73) Assignee: Carl Zeiss SMT GmbH, Oberkochen (DE)

( * ) Notice: Subject to any disclaimer, the term of this patent is extended or adjusted under 35 U.S.C. 154(b) by 912 days.

(21) Appl. No.: 11/748,151

(22) Filed: May 14, 2007

(65) Prior Publication Data

US 2007/0266733 A1    Nov. 22, 2007

Related U.S. Application Data

(60) Provisional application No. 60/747,469, filed on May 17, 2006.

(30) Foreign Application Priority Data

May 17, 2006  (DE) .......................... 10 2006 023 355

(51) Int. Cl.
*C03C 21/00*  (2006.01)
*C03C 19/00*  (2006.01)
(52) U.S. Cl. .................. 65/30.1; 65/61; 65/111; 65/426
(58) Field of Classification Search .................... 65/30.1, 65/61, 111, 426
See application file for complete search history.

(56) References Cited

U.S. PATENT DOCUMENTS

| | | | |
|---|---|---|---|
| 5,616,159 A * | 4/1997 | Araujo et al. ................... | 65/17.4 |
| 6,205,818 B1 | 3/2001 | Seward, III | |
| 6,220,059 B1 | 4/2001 | Klein et al. | |
| 6,295,841 B1 | 10/2001 | Allan et al. | |
| 6,672,109 B1 | 1/2004 | Hiraiwa et al. | |
| 7,007,510 B2 | 3/2006 | Ueda et al. | |
| 2001/0055826 A1 | 12/2001 | Chiba | |

(Continued)

FOREIGN PATENT DOCUMENTS

DE    195 47 904 A1    6/1997

(Continued)

OTHER PUBLICATIONS

Shelby J.E., "Radiation effects in hydrogenimpregnated vitreous silica" in J. Appl. Phys. vol. 50, pp. 370 ff. (1979).

(Continued)

*Primary Examiner* — Khanh Nguyen
*Assistant Examiner* — Carson Gross
(74) *Attorney, Agent, or Firm* — Sughrue Mion, PLLC

(57) ABSTRACT

The invention relates to a method for the manufacture of a lens of synthetic quartz glass with increased $H_2$ content, in particular for a lens for an optical system with an operating wavelength of less than 250 nm, in particular less than 200 nm, with the steps:

Figure 1:
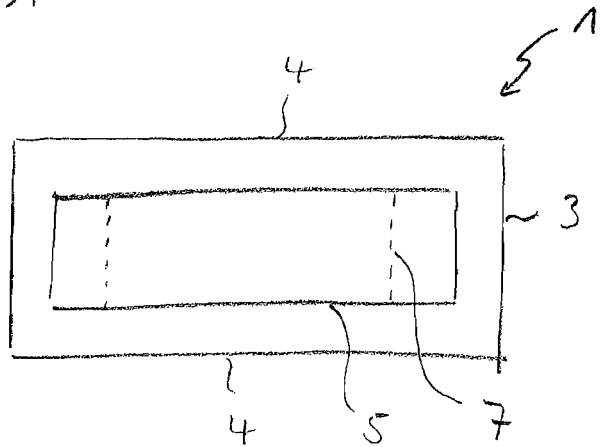

providing a precursor product of synthetic quartz glass, in particular with a first $H_2$ content of less than $2 \cdot 10^{15}$ molecules/cm$^3$, with a circumferential border surface and two base surfaces lying on opposite sides, wherein at least one partial surface of at least one of said base surfaces has a curvature, and treating the precursor product in an $H_2$-containing atmosphere in order to produce a precursor product of synthetic quartz glass with a second $H_2$ content that is increased in relation to the first $H_2$ content, in particular with a second $H_2$ content of more than $10^{16}$ molecules/cm$^3$, and measuring at least one optical property of said precursor product with said second $H_2$ content.

7 Claims, 4 Drawing Sheets

U.S. PATENT DOCUMENTS

| | | | |
|---|---|---|---|
| 2002/0122902 A1* | 9/2002 | Ueda et al. | 428/34.4 |
| 2004/0112088 A1 | 6/2004 | Ueda et al. | |
| 2007/0004579 A1* | 1/2007 | Bookbinder et al. | 501/54 |
| 2007/0066477 A1* | 3/2007 | Harper et al. | 501/54 |

FOREIGN PATENT DOCUMENTS

| | | |
|---|---|---|
| DE | 19942443 | 3/2000 |
| DE | 100 25 786 A1 | 12/2001 |
| DE | 10025786 | 12/2001 |
| EP | 1114802 | 7/2001 |
| EP | 1 211 226 A2 | 6/2002 |
| JP | 04097922 | 3/1992 |
| JP | 9-235134 A | 9/1997 |
| JP | 09235134 | 9/1997 |

OTHER PUBLICATIONS

Van Peski, C.K. et al., "Behavior of Fused Silica Irradiated by Low Level 193 nm Excimer Laser for Tens of billions of Pulses," SPIE, vol. 4347, pp. 177-186 (2001).

* cited by examiner

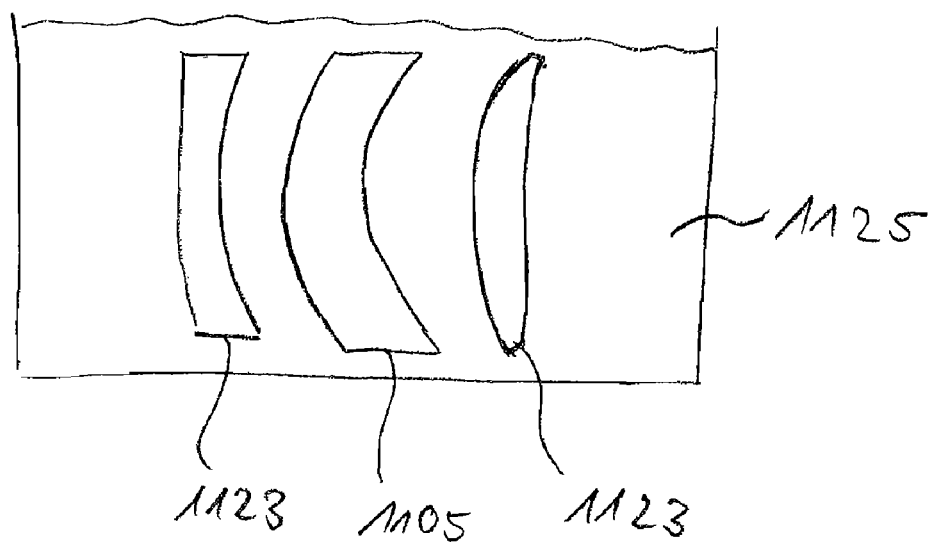
fig. M

METHOD FOR MANUFACTURING A LENS OF SYNTHETIC QUARTZ GLASS WITH INCREASED $H_2$ CONTENT

CROSS REFERENCE TO PRIOR APPLICATION

The present application claims the benefit of U.S. Patent Application Ser. No. 60/747,469, filed May 17, 2006 and German Patent Application Serial No. 10 2006 023 355.7, filed May 17, 2006, both of which are hereby incorporated by reference in its entirety.

TECHNICAL FIELD

The invention relates to a method for manufacturing lens of synthetic quartz glass with increased $H_2$ content lens that is to be used in an optical system with an operating wavelength of less than 250 nm, in particular less than 200 nm. The invention further relates to a precursor product for the manufacture of a lens of this kind, to a lens, and to an optical system.

BACKGROUND

Because of its very good transmission properties for wavelengths as short as 180 nm, quartz glass is frequently used as a material for optical elements, in particular for lenses in optical systems, which are operated with laser light sources, in particular with excimer laser light sources, at wavelengths in the UV range. An example that can be named for this type of a system is a projection exposure apparatus for applications in microlithography. Projection exposure apparatus of this type are used frequently at operating wavelengths of 248 nm or 193 nm. Other optical systems which are likewise operated in this range of wavelengths are laser-machining systems, exposure systems for the manufacture of flat panel displays, specifically TFT (Thin Film Transistor) displays, systems for TFT annealing, inspection systems for the detection of defects.

A microlithography projection exposure apparatus includes—besides a projection objective for projecting an image of a structure of a reticle onto a light-sensitive substrate (the wafer)—further optical subsystems, in particular an illumination system serving to produce a homogeneous illumination of the reticle. All of these optical systems are made preferably of synthetic quartz glass.

A manufacturing method for synthetic silicon dioxide glass of high transmissivity for ultraviolet radiation with wavelengths as low as 157 nm and a small OH content is described in DE 199 42 443 A1 (which corresponds to U.S. Pat. No. 6,376,401). A special procedure which is referred to as soot process, is said to make it possible to reduce the content of hydroxyl (OH) groups into the range below about 70 ppm while simultaneously minimizing the content of chlorine and metallic contaminations. The aim in trying to minimize the content of OH groups is to obtain an improved transmissivity, based on the assumption that these hydroxyl groups cause an absorption in a band of the ultraviolet range around 165 nm which leads to a lowering of the transmissivity of the quartz glass for radiation with a wavelength of 157 nm.

According to JP 4-97922, a high content of OH groups is said to lead to a reduction of the induced absorption of the glass under UV laser radiation.

An adequate transmissivity of the quartz glass material is however only one prerequisite for its suitability to work in highly complex optical systems such as for example illumination systems or projection objectives for microlithography applications. It is known that exposure to laser radiation with a wavelength of, for example, 193 nm can lead to radiation-induced changes of the density of the quartz glass material which are accompanied by changes of the refractive index. These changes of the optical properties can, among other risks, lead to imaging errors which impose a limit on the useful life of the systems and in some cases necessitate an exchange of components and a readjustment.

An effect that has been known for some time is the radiation-induced increase in the density of the quartz glass material which is accompanied by an increase of the refractive index in the irradiated area. This effect is referred to as compaction and is a frequently investigated phenomenon whose existence can be proven most clearly under irradiation with relatively large energy densities, for example exceeding 0.5 $mJ/cm^2$. As a means of avoiding that compaction will occur to a critical extent at the typical energy densities and wavelengths in the operation of lithography systems, it has been proposed to pre-irradiate the quartz glass material under high energy densities or to compress it mechanically to a higher density, so that the compaction is largely completed already before the quartz glass material is put into service and that, as a result, a material is obtained which is relatively stable at the radiation densities at which it is used (see for example (U.S. Pat. No. 6,205,818 B1 and U.S. Pat. No. 6,295,841 B1).

However, at low energy densities in the range of the energy densities used in lithography systems, a countervailing effect manifests itself which is connected to the radiation-induced expansion of the material and causes a lowering of the refractive index. This effect of a radiation-induced decrease in density is referred to as rarefaction. The effect is mentioned in the articles "Radiation effects in hydrogen-impregnated vitreous silica" by J. E. Shelby in J. Appl. Phys. Vol. 50, pp. 370 ff. (1979) or "Behavior of Fused Silica Irradiated by Low Level 193 nm Excimer Laser for Tens of Billions of Pulses" by C. K. Van Peski, Z. Bor, T. Embree and R. Morton, Proc. SPIE, Vol. 4347, pp. 177 to 186 (2001).

A further aging effect observed in lithography systems, particularly if the lenses are irradiated with polarized light, is the so-called polarization-induced birefringence (PIB). It has however been found that dry synthetic quartz glass materials, meaning materials of low OH content, have particularly low compaction—and PIB values.

As is the case with all synthetic quartz glass materials for excimer laser applications in the UV range of wavelengths, a certain minimum content of $H_2$ is necessary in order to provide the amounts consumed by the laser-induced effects. If no $H_2$ or not enough $H_2$ is introduced into the material during its manufacture, the induced absorption and compaction increase strongly as soon as there is no longer any free $H_2$ present in the glass after it has been exposed to a radiation for a certain length of time. The required minimum content can be calculated from the pulse count and energy density expected during operation for each lens at its particular position in the optical system. In the simplest case, the $H_2$ consumption has a quadratic dependency on the energy density, a linear dependency on the pulse count, and a linear or sub-linear dependency on the reciprocal of the pulse count. A model can be established by measurements of the $H_2$ consumption after exposure to radiation with different energy densities.

In quartz glass materials of low OH content, the hydrogen at higher temperatures bonds with the glass matrix, which leads to isolated Si—H terminations instead of the endless Si—O—Si chain bonds. This effect changes the quartz glass in such a way that the optical performance can no longer be assured. Furthermore, the hydrogen contained in the quartz glass moves out. This shortens the useful life of optical components that are made according to such a method and are used in lithography optics under irradiation with light in the range of wavelengths of about 150 nm to 250 nm, for example 193 nm.

In an attempt to work around this effect, one follows a method where in a first step, a blank of essentially hydrogen-free raw glass is produced and the blank is charged with $H_2$ only after all heat treatments such as sintering, shaping and stress-release-tempering have been completed. A substantially hydrogen-free raw glass in this context means a raw glass with a hydrogen content that is lower by a factor of 10 than the hydrogen content specified for a later application. The charging occurs under normal pressure or a slight overpressure of a few bar in an inert gas atmosphere with an $H_2$ content of 5% or more. The temperature in this process, as a rule, is kept under 600°.

The blanks are usually cast or press-formed into a cylindrical mold. Typical blanks for the manufacture of lenses for a microlithography projection exposure apparatus have a thickness of 20 to 90 mm and, prior to being charged with hydrogen, an $H_2$ content of fewer than $2 \cdot 10^{15}$ molecules/cm$^3$. The charging with hydrogen in order to increase the $H_2$ content by a factor of 10 requires typically a few weeks to months wherein, based on the laws of diffusion, the charge time increases with the square of the thickness of the blank.

To produce a lens for an optical system of the kind described above, in particular for a projection objective or an illumination system of a projection exposure apparatus for lithography applications, a precursor product is cut out of the cylindrical blank, is brought into the desired lens shape through material-removing work procedures, and this precursor product is then made into a lens through finishing processes.

Now, in view of what has been said above, the invention has the objective to provide a method of manufacturing a lens to be used in an optical system for UV light, wherein the process time required for the charging with hydrogen is shortened.

SUMMARY

This objective is achieved by a method for the manufacture of a lens of synthetic quartz glass in accordance with claim 1.

Further advantageous aspects of the invention are a precursor product of synthetic quartz glass according to claim 50 and 51, as well as a lens of synthetic quartz glass according to claims 59 and 60, and an optical system according to claim 66.

Advantageous further developed embodiments are presented in the dependent claims.

Unlike the conventional method wherein as a first step a hydrogen-free cylindrical blank is charged with $H_2$ and wherein a precursor product for a lens is subsequently produced from the blank through material-removing work processes, the method according to the present invention consists of providing at the outset a precursor product which has a border surface defining its circumference and two base surfaces on opposite sides, wherein at least a partial area of at least one of the base surfaces has a curvature, so that the precursor product already has a shape that approximates the shape of the lens which is to be manufactured from the precursor product. The curvature of a surface in the present context means a deviation of a surface from a tangent plane which progressively increases with the distance from the point of contact. A tangent plane is the plane which touches the curved surface and which extends perpendicular to the normal vector of said surface in a given point.

For the charging with hydrogen, the precursor product with this geometry is treated in an $H_2$-containing atmosphere, whereby a precursor product of synthetic quartz glass with an increased $H_2$ content is obtained.

Such a precursor product, whose geometry is already oriented towards the eventual lens shape, has a markedly smaller thickness and thus also a lower volume to be charged with $H_2$ than a corresponding cylindrical blank which is machined and brought into the lens shape only after the $H_2$ treatment. As the charging time depends on the thickness in a quadratic relationship, this shortening of the diffusion paths has the result of a clearly shortened process time.

By measuring at least one optical property of the precursor product after charging it with $H_2$, the optical quality of the precursor product can be assured. Possible optical properties to be measured after the charging process are homogeneity, stress-induced birefringence and transmissivity. It is advantageous to measure these properties after the charging treatment, because this process influences the optical properties.

In addition or alternatively, it is advantageous in an additional step to work at least one of the base surface of the precursor product so as to produce a final lens shape after the treating under the $H_2$-containing atmosphere. It is particularly advantageous to remove during this working step a surface layer of at least 0.05 mm to at least 2 mm thickness, because during the $H_2$-treatment impurities of the treating chamber, will diffuse into the surface of the precursor product. These impurities reduce the transmission of the lens for UV-light. By removing at least 0.05 mm to at least 2 mm at each position of the base surface, in particular within an optically used portion of the lens to be manufactured from the precursor product, the contaminated quartz glass material is removed.

Due to the geometry of the precursor product which deviates from the cylindrical shape, the treatment of the precursor product with an $H_2$-containing atmosphere produces a distribution of $H_2$ and of SiH in the precursor product in which layers of equal $H_2$-concentration or SiH concentration don't follow the shapes of rotational ellipsoids or sections of rotational ellipsoids as would be the case in cylindrical blanks. Instead, the surfaces of equal concentration are layered substantially parallel to the surfaces, i.e. to the base surfaces and the circumferential border surface of the precursor product. In a further developed version of the method, it is therefore possible to achieve a desired $H_2$— or SiH distribution by selecting the geometry of the precursor product in such a way that the diffusion of hydrogen into the precursor product in accordance with the laws of diffusion leads to the desired distribution.

When a layer of at least 0.05 mm to at least 2 mm is removed from the surface of the precursor product after the charging process, the concentration of typical impurities which are introduced into the surface portions of the precursor product during the hydrogen treatment such as metal impurities like Li, Na, K, Ca, Mg, Fe, Cr, Ni, Cu, Al or Ti in the surface portion of the final lens is less than 10 ppm, in particular less than 5 ppm or even less than 2 ppm. For each of the mentioned metal impurities the concentration can be less than 1 ppm, in particular less than 0.01 ppm. If the precursor product is made of particularly pure synthetic quartz glass, the concentration of the metal impurities can even be below the detection limit.

BRIEF DESCRIPTION OF THE DRAWING FIGURES

Further features and advantages of the invention are presented hereinafter in the description of examples of embodiments of the invention with references to the drawing figures which show details of the invention, and in the claims. Each of the features can be realized individually by itself or in any desired combination of a plurality of features in a variant version of the invention.

Figure 2:
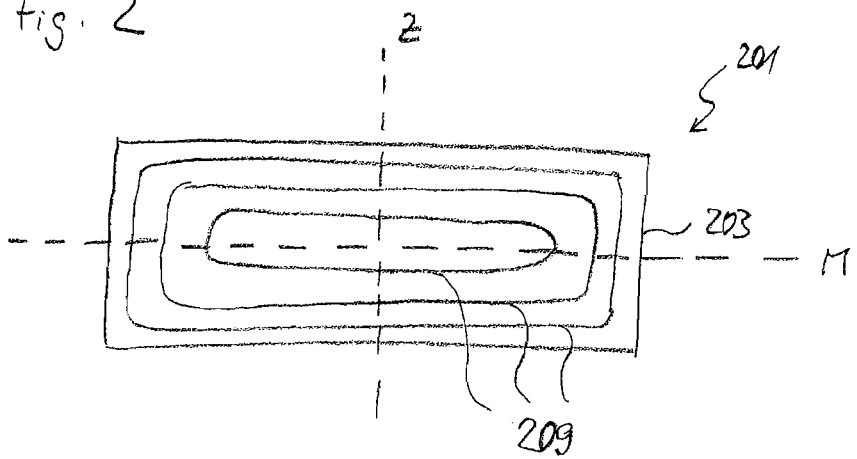
Figure 3:
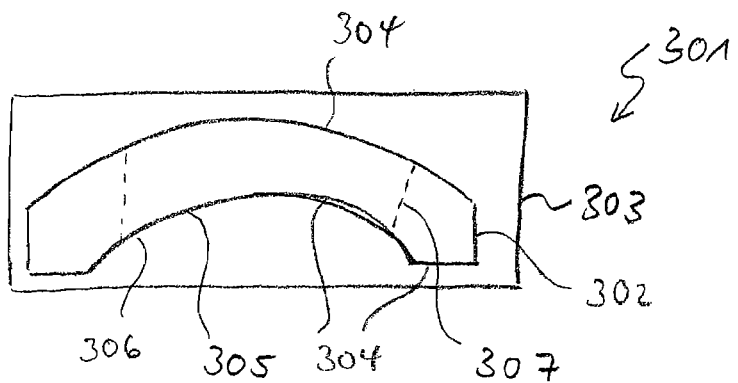
Figure 4:
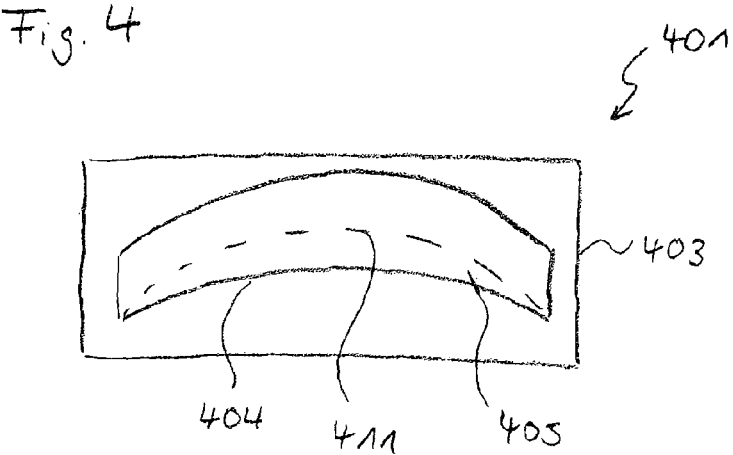
Figure 5:
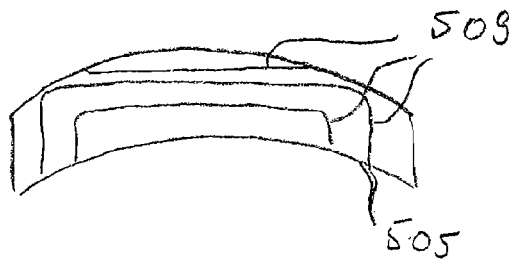
Figure 6:
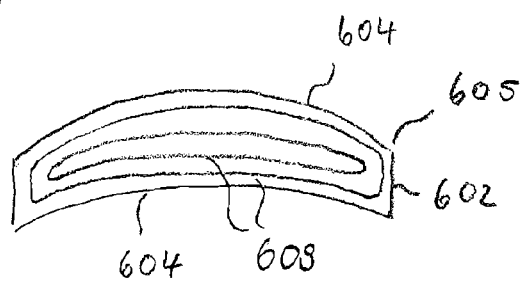
Figure 7:
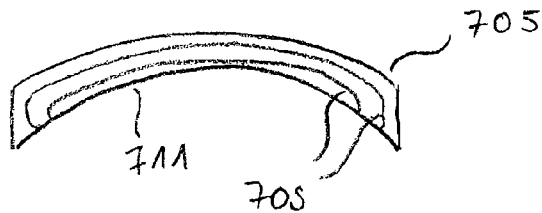
Figure 8:
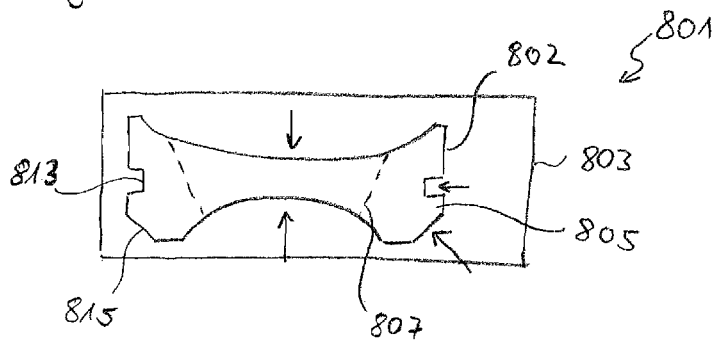
Figure 9:
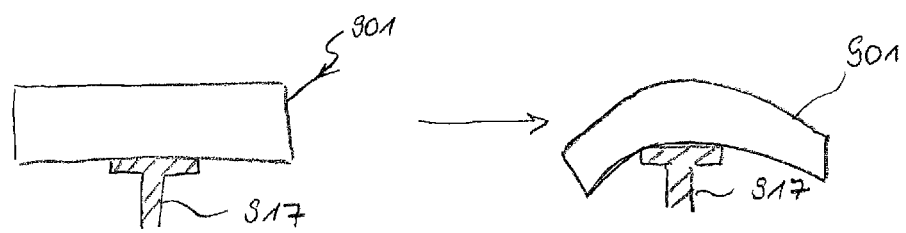
Figure 10:
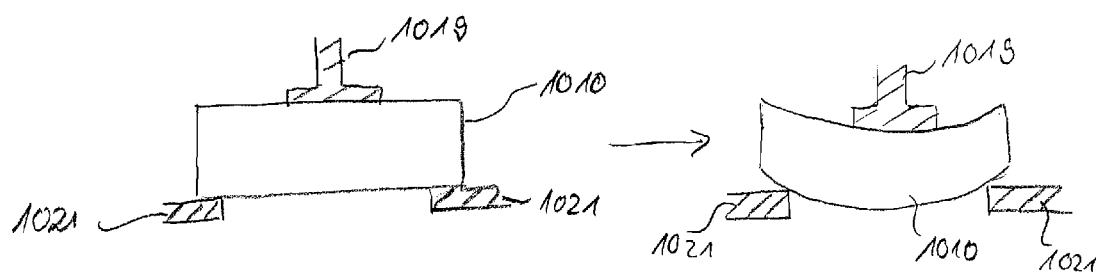

FIG. 1 schematically illustrates the geometry of a blank and of a precursor product according to the existing state of the art;

FIG. 2 schematically shows the $H_2$— and SiH distributions in a cylinder-shaped hydrogen-charged blank;

FIG. 3 schematically illustrates the geometry of a blank and of a precursor product according to the invention;

FIG. 4 schematically illustrates a further developed embodiment of the invention which serves to obtain a desired $H_2$— or SiH distribution;

FIG. 5 schematically illustrates an $H_2$— or SiH distribution in a precursor product made according to the existing state of the art;

FIG. 6 schematically illustrates an $H_2$— or SiH distribution in a precursor product made under the method according to the invention;

FIG. 7 schematically illustrates a lens with an $H_2$— or SiH distribution that has been made under the method according to the invention;

FIG. 8 schematically illustrates a further developed embodiment of the invention which serves to influence the $H_2$— or SiH distribution in a precursor product;

FIG. 9 schematically illustrates a first possible way for the manufacture of a precursor product that is to be charged with hydrogen in a next-following step;

FIG. 10 schematically shows a second possible way for the manufacture of a precursor product that is to be charged with hydrogen in a next-following step;

FIG. 11 schematically illustrates an arrangement for the quality control of a lens made according to the inventive method.

DETAILED DESCRIPTION OF EXEMPLARY EMBODIMENTS

The lenses manufactured from cylindrical blanks always have a smaller local thickness than the respective blanks. If the blanks are received in the uncharged state and processed into their approximate lens shapes or even already into their final lens shapes, the diffusion paths in the hydrogen treatment will be shortened significantly.

This principle is visualized once more in FIGS. 1 to 3: FIG. 1 shows a vertical cross-section of a cylindrical blank 1 of synthetic quartz glass which still has an original hydrogen content of less than $2 \cdot 10^{15}$ molecules/cm$^3$. The blank 1 has a border surface 3 around its circumference and two base surfaces 4 opposite each other. According to the conventional method, this blank 1 is treated in an $H_2$-containing inert gas atmosphere for several weeks up to months at a temperature of about 500° C. Subsequently, a part of the surfaces 3 and 4 may be removed whereby the precursor product 5 is obtained from which a lens will subsequently be manufactured in further process steps. The volume portion 7 which will later in the finished lens be traversed by UV radiation and thus exposed to the damage caused by the intensive radiation is indicated in FIG. 1 by a broken line.

As a result of the treatment in an $H_2$-containing atmosphere, also referred to as hydrogen treatment, a diffusion of $H_2$ into the blank takes place through the surfaces 3 and 4, so that a three-dimensional distribution of the $H_2$ concentration is set up inside the blank. This is shown in FIG. 2. The surfaces 209 of constant $H_2$ concentration form rotational ellipsoids which share a median plane M. This median plane M coincides with the median plane of the blank during the charging process. The cylindrical blank 1 further has a rotational symmetry axis Z which simultaneously represents the rotational symmetry axis of the rotational ellipsoid surfaces 209 of constant $H_2$ concentration. The $H_2$ concentration profile indicates a lower $H_2$ content in the volume portion around the intersection of the median plane M with the rotational symmetry axis than in the parts of the blank that are closer to the surface.

The process of charging the quartz glass with hydrogen at high temperatures is accompanied by an increase in the formation of silane and siloxane compounds which is more pronounced the higher the OH content of the quartz glass. Silane (SiH) splits up reversibly under laser irradiation, with the products of the split exhibiting a strong and wide-band absorption around 215 nm which has a detrimental effect on the transmissivity of the quartz glass. Besides, a low silane content is advantageous because it leads to reduced dynamic fluctuations of the transmissivity in the system and in some cases may lessen the degree of compaction and polarization-induced birefringence. If silane is produced in the hydrogen treatment, a very similar three-dimensional distribution as for the $H_2$ concentration also occurs for the SiH concentration, with rotational ellipsoid surfaces of equal SiH concentration.

In principle, however, the charging with hydrogen is performed at such low temperatures that the formation of silane is largely suppressed. This requires a process temperature of less than 500° C. in the treatment of the blank in an $H_2$ atmosphere.

In one embodiment of the inventive method for the manufacture of a precursor product of synthetic quartz glass with increased $H_2$ content, which is illustrated schematically in FIG. 3, the blank 301 which has not yet been charged with hydrogen is processed into a precursor product 305 which has a circumferential border surface 302 and two base surfaces 304 on opposite sides of each other. The blank 301 and, accordingly, the precursor product 305 originally have a hydrogen content of less than $2 \cdot 10^{15}$ molecules/cm$^3$.

The base surface 304 of the precursor product 305 has a least a partial area 306 with a surface curvature. The volume portion 307 of the precursor product 305 which in the lens element to be produced from it will be traversed by UV radiation is again indicated by a broken line.

The precursor product 305 cut out of the blank 301 is now subjected to a treatment with an $H_2$-containing inert gas atmosphere, in particular a nitrogen atmosphere with a hydrogen content of 5% to 25%. The pressure in the process atmosphere is set between 1 bar and 10 bar, and the temperature is set at less than 600° C., in particular at less than 500° C., and preferably at less than 450° C. This is the way in which the precursor product 305 is enriched with $H_2$. For the volume portion which in the lens to be produced of the precursor product 305 will be traversed by UV radiation, the so-called optically useful portion 307, a minimum for the $H_2$ content is set at $5 \cdot 10^{15}$ molecules/cm$^3$, but preferably $1 \cdot 10^{16}$ molecules/cm$^3$, and with particular preference $5 \cdot 10^{16}$ molecules/cm$^3$.

The $H_2$-enriched precursor product in a preferred embodiment has an OH content of less than 150 ppm in proportion to weight, preferably less than 70 ppm, and with particular preference less than 30 ppm. The decadic extinction coefficient, which can be determined at 193 nm from Lambert-Beer's law, has preferably a value k of less than $2 \cdot 10^{-3}$/cm.

As can be seen directly from FIG. 3, the precursor product 305 has a strongly reduced thickness in comparison to the blank 301. Consequently, as only the precursor product 305 has to be charged with hydrogen, the process time can be shortened significantly.

Particularly suitable for the method of the foregoing description are lenses with a meniscus-shaped geometry in which both base surfaces are curved in the same sense and have approximately the same curvature radius. Their local thickness is substantially constant and significantly smaller than the thickness of the blank. For manufacturing reasons and in the interest of a mechanically stable technical solution for the mount, the lens can be extended several centimeters farther than the optically used area 307. This outer area can have a complex shape, i.e. it can have rotationally symmetric bevels, sockets or other cutouts.

As will be made evident in the following through FIGS. 4 to 6, the distribution of the hydrogen concentration inside the volume of a precursor product of synthetic quartz glass with increased $H_2$ content made according to the inventive method also differs significantly from a precursor product which is cut from a blank that has been charged before with $H_2$, as was customary under the conventional method.

FIG. 4 schematically illustrates a cylindrical blank 401 from which likewise a precursor product 405 is cut. If this cylindrical blank is charged with hydrogen as described above, a three-dimensional $H_2$ concentration profile establishes itself as described above in the context of FIG. 2, wherein surfaces of equal $H_2$-concentration, and accordingly also surfaces of equal SiH-concentration, if applicable, have the shapes of rotational ellipsoids. Now, if a precursor product for an optical element is cut from this blank 401, it will have an $H_2$-concentration profile (and accordingly an SiH concentration profile) of the type shown in FIG. 5: the precursor product 505 will have surfaces 509 of equal $H_2$ concentration which represent at least portions of rotational ellipsoids. With this method, if one wants to set a target for a specific $H_2$ concentration profile in the manufacture of precursor products with increased $H_2$ content, the only possibility available is that on the basis of the given $H_2$ concentration profile of the blank 401 one selects a section which approximates as closely as possible the desired $H_2$ concentration profile of the precursor product 505 and, accordingly, of the lens that is to be produced later from the precursor product 505.

If on the other hand, the precursor product 405 is first cut out of the blank 401 and subsequently charged with hydrogen, a significantly different $H_2$ concentration profile (and accordingly an SiH concentration profile) will establish itself, as can be seen in FIG. 6. Since the hydrogen which has been added to the inert gas atmosphere diffuses equally through all surfaces of the precursor product 605 in accordance with the laws of diffusion, i.e. through the border surface 602 as well as through the base surfaces 604, a distribution of the $H_2$ concentration is obtained wherein surfaces 609 of constant $H_2$ concentration extend substantially parallel to the nearest base surface 604 and/or to the border surface 602 of the precursor product 605. This parallelism applies primarily to the portions that are near the surface, in particular in a central area that extends to about 70% of the diameter of the precursor product, because border effects can occur in the portions that are close to the border. Towards the center of the precursor product 605, the surfaces 609 of constant $H_2$ concentration have a curvature which approximately equals the average between the curvatures of the two base surfaces 604. At the same time, the amount of the $H_2$ concentration decreases with increasing distance of a surface 609 from an outside surface 602, 604 towards the center of the precursor product 605. At a higher charging temperature, an analogous distribution sets in for the SiH content.

In a variation of the method it is therefore also possible to set a desired distribution of the $H_2$ concentration, as is explained in the context of FIG. 7 and FIG. 4. To achieve this purpose, the charging with hydrogen may in some cases be carried out on a precursor product which has only a remote similarity to the final shape of the lens that is to be manufactured from the precursor product. For example, the curvature of the base surface 404 of the precursor product 405 in FIG. 4 deviates strongly from the curvature of the base surface 411 of the lens to be manufactured later from the precursor product, which is indicated by a broken line. After charging the precursor product 405 with hydrogen, an $H_2$ concentration profile as shown in FIG. 6 establishes itself. The precursor product of increased $H_2$ content which is obtained in this manner is subsequently processed further, by removing enough material at its base surface 404 to arrive at the curvature of the surface 411. By means of further finishing steps such as polishing the precursor product to a specified surface roughness, and through a further finishing step of removing material in particular in locally targeted areas by means of a locally acting removal technique such as ion beam figuring (IBF) or magneto-rheological finishing (MRF), as well as coating of the base surfaces with an anti-reflection coating, a lens 705 of the kind shown in FIG. 7 is manufactured from the precursor product. The lens 705 now has an $H_2$ concentration profile (and accordingly, if applicable, an SiH concentration profile) which represents a part of the original profile of the precursor product of FIG. 6.

Quite generally, it is possible to set any $H_2$ concentration profile that is desired for the lens to be manufactured later from a precursor product according to the invention by selecting the geometry of the precursor product so that the desired concentration profile establishes itself in the hydrogen-charging process, and by subsequently carrying out further material-removing operations for the manufacturing of the lens. A meniscus-shaped lens with different curvature radii could for example be given equal curvature radii for the charging in order to achieve an $H_2$ distribution that is as constant as possible.

In concave lenses, the thickness is only in the center significantly smaller than the thickness of the original cylindrical blank. In the hydrogen-charging of a concave precursor product, there is accordingly a tendency that the $H_2$ content will come out higher in the central volume portion around the rotational symmetry axis Z of the precursor product than at the border of the optically used area. This is acceptable if the peaks in energy density are expected to always occur only in the central area of the lens to be manufactured later from the precursor product.

Planar-convex or biconvex lenses as a rule have a center thickness that is only insignificantly smaller than the thickness of the blank as delivered. In this case, the process can be used to advantage if the expected peaks in energy density are not located in the central portion of the lens that is to be manufactured later from the precursor product, or if the lens is strongly curved in relation to its diameter, i.e. if it has a diameter of less than 2.2 times the center thickness. In the latter case there is also a significant lateral diffusion taking place.

FIG. 8 again schematically illustrates a blank 801 of synthetic quartz glass and a precursor product 805 that is to be cut out of the blank. This precursor product 805 is intended for the production of a concave lens and, accordingly, the base surfaces have at least in part opposing curvatures.

As indicated in FIG. 8 by means of arrows, the inward-directed diffusion of hydrogen in the treatment with an $H_2$—containing inert gas atmosphere occurs not only from above and below but through all surfaces of the precursor product 805. The border areas of the optically used area 807, in contrast to the center of this area, are enriched not only from above and below but also from the side, which leads to a more uniform distribution. By setting suitable specifications for the design of mounts, one can try to keep the distance of the outer circumference 802 of the lens from the border of the optically used area 807 as small as possible, in order to support the diffusion into the border area. One should also consider a design with suitable bevels 815 or one or more grooves 813.

In the interest of a uniform or rapid charge, the circumferential border surface 802 can prior to the charging be given a shape that deviates from the final shape. Thus, one can for example provide a circumferential groove 813 which increases the diffusion through the circumference, but which may be taken off again when the final shape of the lens is produced in the manufacturing process. Conversely, in order to lower the $H_2$ content of the optically used portion, it is possible that a bevel 815 or a step that is needed in the final shape is not yet formed at the outset.

A method of manufacturing a lens from a precursor product with increased $H_2$ content, wherein the radiation energy is taken into consideration to which the lens to be manufactured will later be exposed in an optical system for UV light, can include the steps that will now be described. Each of these steps can be realized individually by itself, in any combination of individual steps and partial steps, in a variant version of the invention.

In a first step, the minimally required $H_2$ content is determined based on the later position of the lens and on the basis of $H_2$ consumption models with the objective that at the maximally exposed location and after the specified number of laser pulses over the useful lifetime, the $H_2$ concentration is still more than zero. If the optical system for UV light which is considered in this determination offers the possibility of setting different operating modes (for example different illumination settings in a projection exposure apparatus for microlithography), wherein the operating modes have different profiles for the UV rays passing through the optical system, one can instead use a weighted intensity distribution to which the lens under consideration is exposed at its respective position. If different settings always have their maxima in certain areas (for example always in an inner area or always in an outer area) it is sufficient if the requirement for the minimal content is satisfied for that area.

In a second step, the permissible $H_2$ variation over the optically used area is determined. The decision criteria are the homogeneity of the refractive index and the homogeneity of compaction and transient absorption. Problems with the homogeneity of the refractive index are not to be expected as long as the absolute difference remains below $5 \cdot 10^{17}$ (preferably $1 \cdot 10^{17}$) and the gradient remains below $5 \cdot 10^{16}$/cm (preferably $1 \cdot 10^{17}$). The levels of dependence for compaction and transient absorption on the $H_2$ concentration need to be determined by experiment. In practice, relative differences of the $H_2$ concentration of 1:10, preferably 1:5, appear not to pose problems. As a substitute, it is also possible in regard to compaction and transient absorption to specify SiH variations or gradients, which can be determined by experiment (Raman spectroscopy, or a test of the transmissivity as a function of the irradiated energy density) or can be simulated.

In a third step, a Finite Element (FE) simulation is performed for the $H_2$ diffusion and SiH formation with the objective of adjusting the variation of temperature and partial pressure over time in the hydrogen-charging process of the precursor product in such a way that the given targets are met in regard to $H_2$— and SiH content. In the simulation, it is possible to include high-temperature processes which may be used in the lens-manufacturing process, such as material-removing finishing operations (sputtering, polishing) stress-release tempering, or thin film coating, which lead to a slight outward-directed diffusion of $H_2$ from the material portions near the surface.

In a fourth step, a cylindrical blank of synthetic quartz glass resulting from a soot process with OH<150 ppm, $H_2<2 \cdot 20^{15}$ molecules/cm³ and $k<2 \cdot 10^{-3}$ is subjected to a preliminary shaping operation leading to the final geometry or an approximation of the final geometry of the lens to be manufactured. It suggests itself to follow the standard procedure for making lenses and to stop after the grinding operations have been completed.

In a fifth step, the precursor product manufactured according to the foregoing steps is charged with $H_2$ by being treated in an inert gas atmosphere with $H_2$ content at a temperature that lies between room temperature (25° C.) and up to 600° C., and under a pressure between atmospheric pressure and up to a maximum of 10 bar. It is possible to perform a test for contamination on thin sample platelets, so-called witness samples, which are chemically analyzed or measured for transmissivity. The precursor product which has been charged with hydrogen in this manner has an $H_2$ concentration of at least $0.8 \cdot 10^{15}$ molecules/cm³ at the locations which correspond to lens positions with intermediate to low radiation exposure. For lenses in which a high radiation exposure is expected based on step 1, the precursor product has at the locations that represent the optically used portion of the future lens an $H_2$ content of at least $5 \cdot 10^{16}$ molecules/cm³ and up to at least $5 \cdot 10^{17}$ molecules/cm³ or at least $5 \cdot 10^{18}$ molecules/cm³.

In a sixth step optical properties of the precursor product are measured, for example in regard to homogeneity, stress-induced birefringence and transmissivity.

In a seventh step, at least part of at least one of the base surfaces of the precursor product is worked so as to produce a final lens shape. For example, this step can comprise grinding, lapping, asphericizing, polishing or a combination of these surface working methods. The expression asphericizing means a grinding- or lapping process, which changes a spherical base surface to an aspherical surface shape.

In general, during this working step a surface layer of at least 0.1 to at least 2 mm thickness is removed, whose thickness depends on the cleanness of the charging chamber and which can be determined by experiment. During the charging process impurities of the charging chamber can be incorporated into the surface of the precursor product by diffusion. Typical impurities of this kind are metal impurities like Li, Na, K, Ca, Mg, Fe, Cr, Ni, Cu, Al or Ti. By removing a surface layer of 0.1 to 2 mm thickness, the contaminated portions of the surfaces are removed. When a contamination test is performed during the charging process, for example by means of sample platelets of synthetic quartz, the amount of contaminations of the charging chamber diffusing into the quartz material can be determined. From this, a minimum thickness of the layer to be removed from the surface can be derived.

This surface layer can of course be of non-constant thickness, for example when it is removed as a part of an asphericizing procedure. However, its minimum thickness should be enough to make sure, that the contaminated material is substantially completely removed, which corresponds typically to a minimum thickness between 0.05 mm and 2 mm. This is important in particular for the base surfaces of the lens portion, which corresponds to the optically used portion of the lens to be manufactured, because the Cu and Na contaminations decrease the transmission of the lens for UV-light.

If the customary processes of finish-grinding, lapping, asphericizing and polishing which are required in any case for the manufacture of the lens from the precursor product are not sufficient, which means that the surface layer removed by these processes is not sufficient to remove all the contaminated quartz glass material at the surface of the precursor product, the preliminary grinding prior to the charging process can be interrupted before the charging and continued after the charging.

In order to reduce the amount of scrap in the process, this process can be combined with the grinding of a spherical separating surface, i.e. a cylindrical blank is cut along a spherical surface prior to charging, and the two precursor parts are charged separately.

It is further conceivable that in the production of the original blank the raw mass is not cast into a cylindrical or rectangular mold as customary, but is cast or pressed into a mold which coarsely approximates the later shape of the lens. As an alternative which works without a mold, as illustrated in FIGS. 9 and 10, a disk-shaped blank 901, 1010 could be caused to change its shape by means of a holder setup 917, 1021 which supports the blank at the center or at the edge and by heating, possibly with the help of a ram 1019, so that the blank takes on a curvature or bend.

The optical properties of a non-parallel blank of this kind can be measured in regard to stress-induced birefringence and transmissivity by using beam-rastering systems with a swiveling emitter and detector, which is adequate for many applications that concern illumination.

Homogeneity and stress-induced birefringence can also be measured, as illustrated in FIG. 11, through an interferometric measurement in an immersion bath 1125 and/or with optical compensation systems 1123. As an alternative, one may also consider using Shack-Hartmann wave front sensors.

All of the different ways of practicing the method have in common that with the same minimum contents and $H_2$ gradients, a clearly shorter process time can be achieved than with the previously known method. If the $H_2$ gradient is allowed to be slightly larger than with conventional charging, it is possible to save even more time. For a moderately curved meniscus lens whose center thickness is about half the thickness of the blank, the charge time is decreased to one-fourth. In addition to the savings of process time and cost, there is the further advantage that with the same minimum content, less SiH is formed because the time in which the hydrogen can have its effect is shorter. This results in less compaction and transient absorption in the system.

Alternatively, in the same time and with the same level of SiH formation as in the previously known method, one can achieve a higher $H_2$ content in the charging process.

The invention claimed is:

1. A method for manufacturing a lens of synthetic quartz glass with increased $H_2$ content for an optical system with an operating wavelength of less than 250 nm, comprising:
   (1) providing a precursor product of synthetic quartz glass with a first $H_2$ content of less than $2 \cdot 10^{15}$ molecules/cm$^3$, with a circumferential border surface and two base surfaces on opposite sides, wherein at least one partial surface of at least one of said base surfaces has a curvature,
   (2) treating the precursor product in an $H_2$-containing atmosphere in order to produce a precursor product of synthetic quartz glass with a second $H_2$ content that is increased in relation to the first $H_2$ content to more than $10^{16}$ molecules/cm$^3$, and measuring at least one optical property of said precursor product with said second $H_2$ and
   (3) simulating the $H_2$ diffusion and/or the formation of SiH inside the precursor product which occurs in the treatment under an $H_2$-containing atmosphere and, based on said simulated diffusion and/or formation, determining a temperature and/or a pressure for the treatment of the precursor product in an $H_2$-containing inert gas atmosphere.

2. The method according to claim 1, wherein additionally in the simulation an $H_2$ loss is taken into consideration which occurs in the manufacture of a lens from the precursor product with increased $H_2$ content.

3. A method for manufacturing a lens of synthetic quartz glass with increased $H_2$ content for an optical system with an operating wavelength of less than 250 nm, comprising:
   (1) providing a precursor product of synthetic quartz glass with a first $H_2$ content of less than $2 \cdot 10^{15}$ molecules/cm$^3$, with a circumferential border surface and two base surfaces on opposite sides, wherein at least one partial surface of at least one of said base surfaces has a curvature,
   (2) treating the precursor product in an $H_2$-containing atmosphere, in order to produce a precursor product of synthetic quartz glass with a second $H_2$ content that is increased in relation to the first $H_2$ content
   (3) working at least part of at least one of the base surfaces of the precursor product so as to produce a final lens shape after the treating under the $H_2$-containing atmosphere, and
   (4) simulating the $H_2$ diffusion and/or the formation of SiH inside the precursor product which occurs in the treatment under an $H_2$-containing atmosphere and, based on said simulated diffusion and/or formation, determining a temperature and/or a pressure for the treatment of the precursor product in an $H_2$-containing inert gas atmosphere.

4. The method according to claim 3, wherein additionally in the simulation an $H_2$ loss is taken into consideration which occurs in the manufacture of a lens from the precursor product with increased $H_2$ content.

5. A method for manufacturing at least one lens of synthetic quartz glass with increased $H_2$ content for an optical system with an operating wavelength of less than 250 nm, comprising:
   (1) providing at least one precursor product of synthetic quartz glass with a first $H_2$ content and with a circumferential border surface and two base surfaces on opposite sides, wherein at least one partial surface of at least one of said base surfaces has a curvature,
   (2) simulating at least one of an $H_2$ diffusion and a formation of SiH in the precursor product which occurs in the treatment under an $H_2$-containing atmosphere and, based on the simulated diffusion and/or formation in the precursor product, determining at least one of a temperature and a pressure for treating further precursor products in an $H_2$-containing inert gas atmosphere,
   (3) treating the at least one precursor product in an $H_2$-containing atmosphere, in order to produce at least one precursor product of synthetic quartz glass with a second $H_2$ content that is increased in relation to the first $H_2$ content, and
   (4) working at least part of at least one of the base surfaces of the at least one treated precursor product so as to produce at least one final lens shape.

6. The method according to claim 5, wherein the first $H_2$ content is less than $2 \cdot 10^{15}$ molecules/cm$^3$ and the second $H_2$ content is greater than $1 \cdot 10^{16}$ molecules/cm$^3$.

7. The method according to claim 5, wherein further precursor products are treated in the $H_2$-containing atmosphere and worked to produce respective further final lens shapes.

* * * * *

UNITED STATES PATENT AND TRADEMARK OFFICE
CERTIFICATE OF CORRECTION

| | | |
|---|---|---|
| PATENT NO. | : 7,934,390 B2 | |
| APPLICATION NO. | : 11/748151 | |
| DATED | : May 3, 2011 | |
| INVENTOR(S) | : Eric Eva | |

It is certified that error appears in the above-identified patent and that said Letters Patent is hereby corrected as shown below:

Column 11, Line 63: In Claim 1, line 15, after "$H_2$" insert -- content, --

Column 12, Line 21: In Claim 2, line 21, after "content" insert -- , --

Signed and Sealed this
Tenth Day of July, 2012

David J. Kappos
*Director of the United States Patent and Trademark Office*